United States Patent [19]
Sherry et al.

[11] Patent Number: 5,941,061
[45] Date of Patent: Aug. 24, 1999

[54] AIRCRAFT PROPULSIVE POWER UNIT ASSEMBLY HAVING A LEADING EDGE LIPSKIN AND INTAKE BARREL

[75] Inventors: Philip David Sherry, Antrim; Robert Welsh, Lisburn; Kenneth Henry Johnson, Belfast, all of United Kingdom

[73] Assignee: Short Brothers PLC, Belfast, Ireland

[21] Appl. No.: 08/649,609

[22] PCT Filed: Apr. 12, 1995

[86] PCT No.: PCT/GB95/00830

§ 371 Date: May 24, 1996

§ 102(e) Date: May 24, 1996

[87] PCT Pub. No.: WO95/28318

PCT Pub. Date: Oct. 26, 1995

[30] Foreign Application Priority Data

Apr. 18, 1994 [GB] United Kingdom ............... 9407632

[51] Int. Cl.⁶ .................................................. B64D 29/08
[52] U.S. Cl. ......................... 60/39.31; 60/226.1; 244/54
[58] Field of Search ................. 60/226.1, 226.2, 60/39.31; 244/53 A, 53 R, 54

[56] References Cited

U.S. PATENT DOCUMENTS

| | | | |
|---|---|---|---|
| 4,043,522 | 8/1977 | Vetter | 244/54 |
| 4,399,966 | 8/1983 | Crudden et al. | 244/129.4 |
| 5,157,915 | 10/1992 | Bart | 60/226.1 |
| 5,372,338 | 12/1994 | Carlin et al. | 60/39.31 |
| 5,603,471 | 2/1997 | Armstrong | 244/53 R |
| 5,609,313 | 3/1997 | Cole et al. | 244/54 |

FOREIGN PATENT DOCUMENTS

| | | |
|---|---|---|
| 2202588 | 9/1988 | United Kingdom . |
| 2266080 | 10/1993 | United Kingdom . |
| 2274490 | 7/1994 | United Kingdom . |

*Primary Examiner*—Timothy S. Thorpe
*Assistant Examiner*—Ted Kim
*Attorney, Agent, or Firm*—Fish & Richardson P.C.

[57] ABSTRACT

An aircraft propulsive power unit comprises an engine, a nacelle structure which houses the engine and which includes displaceable nacelle portions which form a forward part of the nacelle structure and which take up operational positions in which a forward end of each nacelle portion forms part of an intake opening which leads to an intake barrel which is located upstream of the engine for the supply of intake air to the engine and which is secured to a forward component of the engine. Each displaceable nacelle portion includes a lipskin structure which has rearwardly extending outer and inner lipskin edge portions, and further includes an outer main skin. The inner lipskin edge portion in the operational position of each displaceable nacelle portion adjoins the forward end of the intake barrel and the power unit includes support structure to support each displaceable portion while permitting it to pivot outwardly to a displaced position to reveal the inner surface of the outer main skin and to give access to the inner surface and to components mounted thereon.

13 Claims, 4 Drawing Sheets

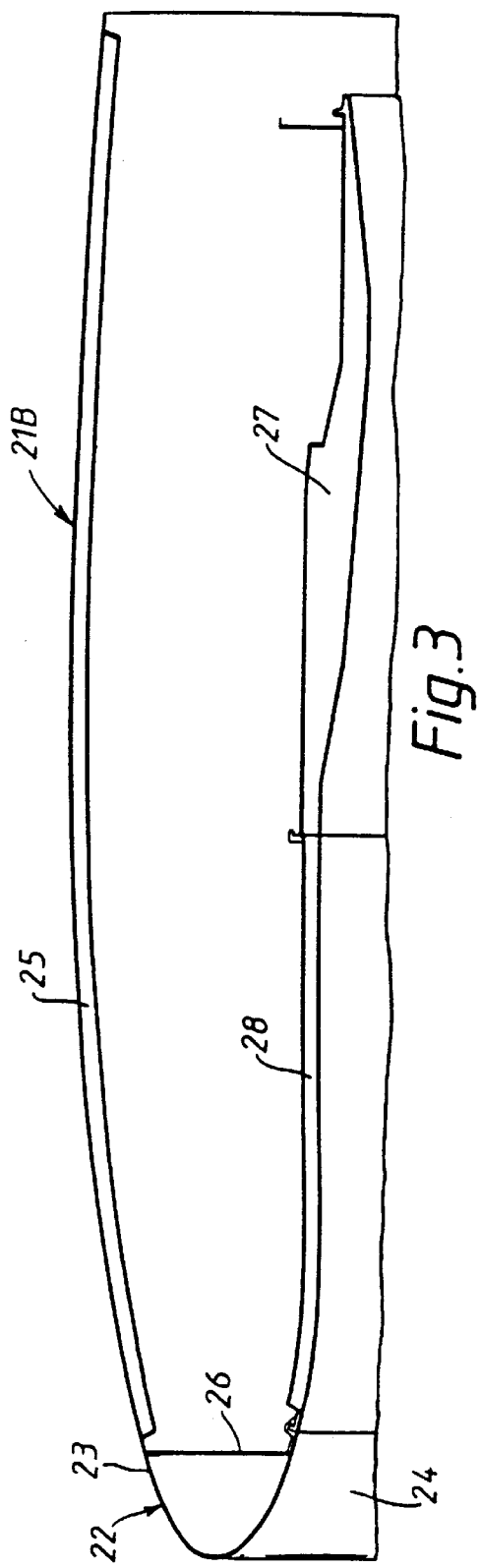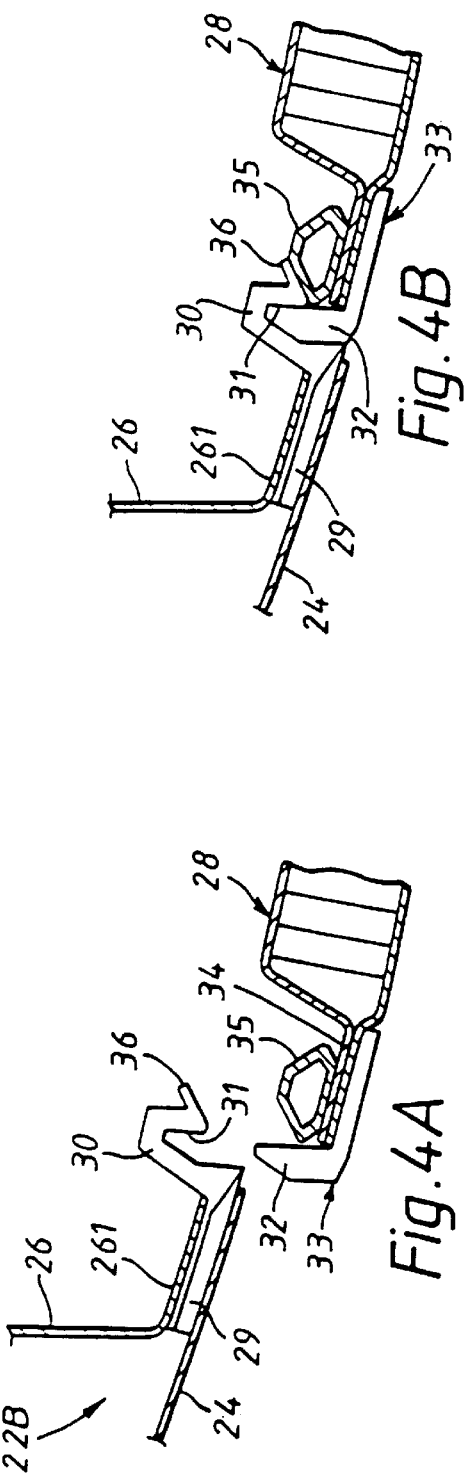

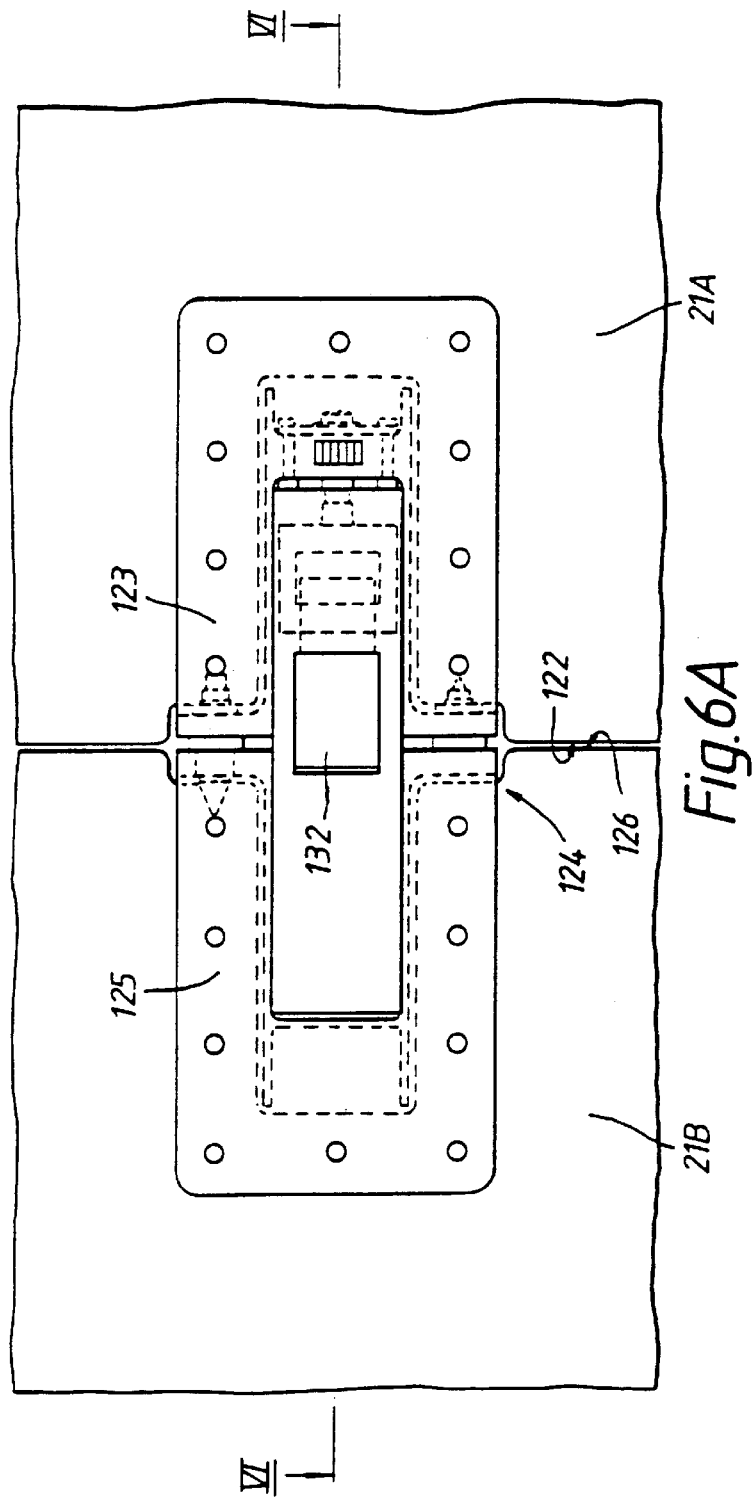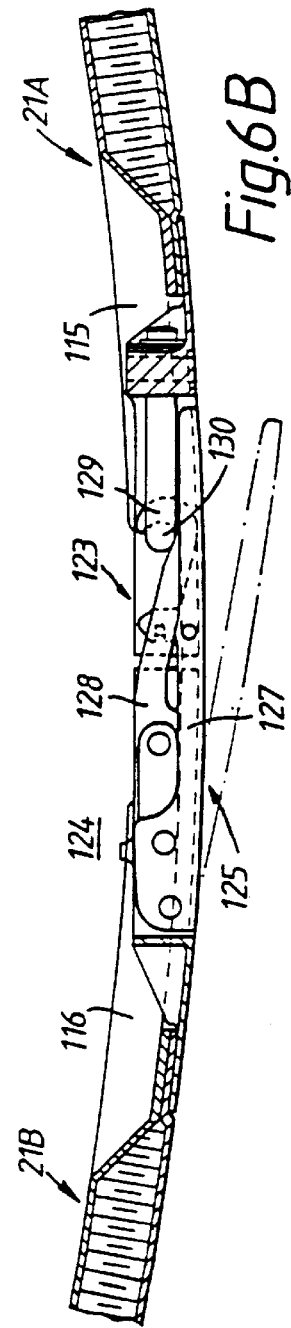

AIRCRAFT PROPULSIVE POWER UNIT ASSEMBLY HAVING A LEADING EDGE LIPSKIN AND INTAKE BARREL

The present invention relates to propulsive power units for aircraft and is particularly although not exclusively concerned with a power unit comprising a ducted fan turbine (turbofan) engine and a nacelle which houses the engine.

The function of the nacelle for a turbofan engine is generally twofold. Firstly, the nacelle must provide an air intake flow to the fan of minimal disturbance for a variety of flight conditions which include high incidence, gusts and the like. Secondly, the exterior profile of the nacelle should be such as to minimise aerodynamic drag, subject to constraints imposed by major engine components such as the accessories gearbox.

Considering the exterior profile, the skin friction component of the overall profile drag is directly affected by the discontinuities on the outer surface. While the ideal would be for a smooth, uninterrupted outer surface, this ideal is compromised in nacelles hitherto proposed by the various breaks in the outer skin which arise due to the doors and panels which are required to gain access to the equipment housed within.

A typical conventional nacelle is shown in FIG. 1 of the drawings, which is a schematic perspective view of an underwing pylon mounted turbofan power unit. The main structural components of the nacelle are the inlet cowl 11, the fan cowl doors 12, the thrust reverser unit 13 and the nozzle 14. The inlet cowl 11 is a single unit, comprising a leading edge lipskin structure 15, an outer main skin 16, an air intake acoustic barrel 17 which serves to attenuate engine noise, and various internal stiffening members and bulkheads. The inlet cowl 11 generally attaches, via a flange at the rear of the acoustic barrel 17, to a front flange of the engine fan case. The fan cowl doors 12 are generally hinged at the pylon 18, and are latched together at the bottom centre line. The thrust reverser unit 13 may take a variety of forms but is typically mounted from the engine casing. The nozzle 14 may be attached in a variety of ways depending upon the exhaust philosophy adopted, i.e., mixed or separate fan stream exhaust and core exhaust. The forms which the thrust reverser and nozzle take only marginally affect the benefits derived from a propulsive power unit according to the present invention and as hereinafter to be described, as will become apparent.

Various inspection doors and removable panels (not shown) are provided in the exterior skin 16 of the inlet cowl 11 of the nacelle shown in FIG. 1 in order to gain access to equipment housed within the cowl 11. The presence of joints occurring between the main exterior inlet cowl skin and such inspection doors and removable panels reduces the aerodynamic efficiency of the exterior surface of the nacelle.

According to the present invention, there is provided an aircraft propulsive power unit comprising an engine, a nacelle structure which houses the engine and which includes a displaceable nacelle portion which forms a forward part of the nacelle structure and which takes up an operational position in which a forward end thereof forms part of an intake opening leading to an intake barrel located upstream of the engine for the supply of intake air to the engine, wherein the intake barrel is secured to a forward component of the engine, wherein the displaceable nacelle portion includes a leading edge profile formed by a lipskin structure at the forward end thereof which has rearwardly extending outer and inner lipskin edge portions, wherein the displaceable nacelle portion further includes an outer main skin which extends rearwardly from the outer lipskin edge portion, wherein the inner lipskin edge portion in the operational position of the displaceable nacelle portion adjoins the forward end of the intake barrel and wherein the power unit includes support means to support the displaceable portion while permitting it to be moved radially outwardly on the support means from its operational position to a displaced position in which it is supported by the support means and in which it is spaced radially outwardly of the intake barrel to reveal the inner surface of the rearwardly extending outer main skin and to give access thereto and to components mounted thereon.

In a preferred embodiment of the invention hereinafter to be described the displaceable nacelle portion has an uninterrupted or substantially uninterrupted low drag exterior surface thereover.

By "uninterrupted or substantially uninterrupted" is meant that no intrusion or breaks are present in the exterior surface of the displaceable nacelle portion or that the intrusion or breaks which are present are limited to those arising from a small number of access panels which may be needed for the purpose of engine serviceability between flights.

In a preferred embodiment of the invention hereinafter to be described the support means is such as to provide for pivotal movement of the displaceable nacelle portion from its operational position to its displaced position.

The need for inspection doors and removable panels in the exterior of the nacelle structure to gain access to components mounted on or within the interior of the displaceable nacelle portion is accordingly removed and the aerodynamic efficiency of the nacelle structure thereby improved.

Aerodynamic research has demonstrated that on conventional nacelle structures as illustrated in FIG. 1 the circumferential gap between the inlet cowl and the fan cowl doors is a further source of nacelle drag.

In the embodiment of the invention hereinafter to be described the engine is a turbofan engine including a ducted fan installation enclosed by a fan case and the outer main skin of the displaceable nacelle portion extends rearwardly from the outer lipskin edge portion to a position in which in the operational position of the displaceable nacelle portion it extends over part of the fan case, which part is inaccessible with the displaceable nacelle portion in the operational position and to which part access is gained by movement of the displaceable nacelle portion to the displaced position.

The need to provide fan cowl doors of the conventional nacelle as shown in FIG. 1 is thereby removed and the aerodynamic drag reduced by eliminating the circumferential forward outer skin break between the inlet cowl and the fan cowl doors.

In an embodiment of the invention hereinafter to be described the rearward end of the displaceable nacelle portion terminates at a position downstream of the fan case.

In the embodiment of the invention hereinafter to be described the nacelle structure includes a rearward nacelle portion and the rearward end of the displaceable nacelle portion when the latter is moved into the operational position adjoins the forward end of the rearward nacelle portion.

In the embodiment of the invention hereinafter to be described the inner lipskin edge portion of the leading edge profile of the displaceable nacelle portion in the operational position includes first engaging means for engaging with second engaging means on the forward end of the intake barrel to provide in the operational position of the displaceable nacelle portion for location of the nacelle portion with respect to the intake barrel and for transmission of operational loads between the displaceable nacelle portion and the intake barrel.

In the embodiment of the invention hereinafter to be described the engine includes a thrust reverser unit rearward of the fan installation and the rearward end of the displaceable nacelle portion in its operational position terminates at the forward extent of the thrust reverser unit.

In the embodiment of the invention hereinafter to be described the displaceable nacelle portion is a first of two displaceable nacelle portions and the second of the nacelle portions is of the same form as the first displaceable nacelle portion and takes up an operational position in the structure at another part thereof in the same manner as the first displaceable nacelle portion. Furthermore, support means are provided to support the second displaceable nacelle portion in the same manner as the first displaceable nacelle portion to permit it to be moved outwardly on the support means from its operational position to a displaced position in which it is supported by the support means and in which it is spaced outwardly of the intake barrel to reveal the inner surface of the rearwardly extending outer main skin and to give access thereto and to components mounted thereon.

In the embodiment of the invention hereinafter to be described the support means extends along the top of the nacelle structure, and each of the first and second displaceable nacelle portions is supported at an uppermost edge thereof by the support means for pivotal movement with respect thereto. The first of the displaceable nacelle portions extends downwardly in an arcuate configuration to form a forward part of the nacelle structure on one side thereof and terminates at a lowermost edge thereof at or in the region of the base of the nacelle structure and the second of the displaceable nacelle portions extends downwardly in an arcuate configuration to form a further forward part of the nacelle structure on the other side thereof and terminates at a lowermost edge at or in the region of the base of the nacelle structure.

In the embodiment of the invention hereinafter to be described the first and second displaceable nacelle portions engage each other at their lowermost edges at the base of the nacelle structure, and securing means are provided to secure the lowermost edges of the two displaceable nacelle portions in engagement with each other.

Where a forward region of the uppermost edge of each displaceable nacelle portion extends beyond the foremost point at which the edge is pivotally supported by the support means securing means are provided to secure the forward region of the uppermost edge of the displaceable nacelle portion in the operational position.

The support means conveniently forms part of a supporting structure which supports the power unit and in the embodiment of the invention hereinafter to be described the power unit is arranged for underwing mounting on an aircraft and the supporting structure forms or forms part of a wing mounted pylon member for supporting the unit.

One embodiment of the invention will now be described by way of example with reference to the accompanying drawings in which:

FIG. 1 is a schematic perspective view (hereinbefore referred to) of a typical conventional underwing pylon mounted turbofan power unit including a nacelle structure as hitherto proposed FIG. 2 is a schematic perspective view of an underwing pylon mounted turbofan power unit including a nacelle structure according to the invention and showing port and starboard displaceable nacelle portions in their displaced positions in which they give access to components and equipment within the nacelle structure FIG. 3 is a schematic horizontal scrap section of the starboard displaceable nacelle portion shown in FIG. 2 in its operational position FIG. 4A is a scrap view of the forward end of the starboard displaceable nacelle portion illustrated in FIG. 2 disengaged from the forward end of an intake barrel of the power unit FIG. 4B is a scrap view corresponding to that of FIG. 4A and illustrating the forward end of the starboard displaceable nacelle portion in engagement with the forward end of the intake barrel of the power unit.

FIG. 6A is a schematic scrap plan view from below of a latch mechanism for latching together the lower edges of the port and starboard displaceable nacelle portions shown in FIG. 2.

FIG. 6B is a schematic scrap section taken on the line VI—VI in FIG. 6A.

Figure 2:
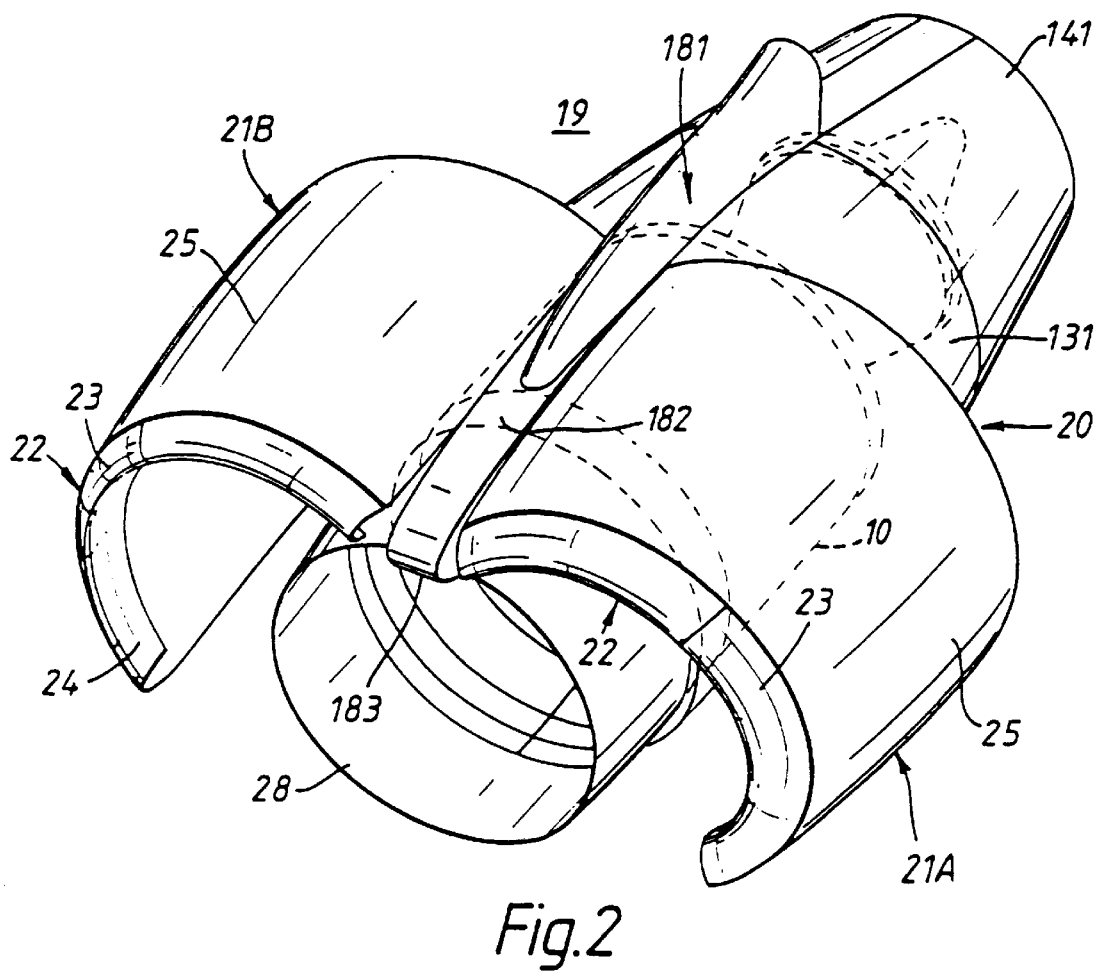

Referring now to FIG. 2 of the drawings, a power unit 19 is shown supported by a pylon 181 underwing mounted on an aircraft for which the power unit 19 provides propulsive power. The power unit 19 includes a turbofan engine (10) enclosed in a nacelle structure 20 which includes a port displaceable nacelle portion 21A and a starboard displaceable nacelle portion 21B, both of which are shown in their displaced positions, a thrust reverser portion 131 and a nozzle portion 141. Each of the displaceable nacelle portions 21A and 21B includes a leading edge 22 formed by a lipskin structure having rearwardly extending outer and inner lipskin edges 23 and 24 and an outer main skin 25 which extends rearwardly from the outer lipskin edge 23.

Referring now to FIG. 3, a scrap horizontal section is shown of a forward part of the power unit 19 shown in FIG. 2. It reveals the starboard displaceable nacelle portion 21B with its leading edge 22 formed by the outer and inner lipskin edges 23 and 24, a forward bulkhead 26 and the outer main skin 25. Also shown is a scrap section of a fan case 27 of a fan installation of the turbofan engine housed within the nacelle structure and a scrap section of an acoustic barrel 28 mounted on the forward end of the fan case 27.

The starboard nacelle portion 21B is shown in FIG. 3 in its operational position in which the rear end of the outer main skin 25 engages the forward end of the thrust reverser unit 131 and the rearwardly extending inner lipskin edge 24 engages the forward end of the intake acoustic barrel 28. The port nacelle portion 21A occupies an operational position on the other side of the nacelle structure in the same manner as the starboard nacelle portion 21B.

Figure 1:
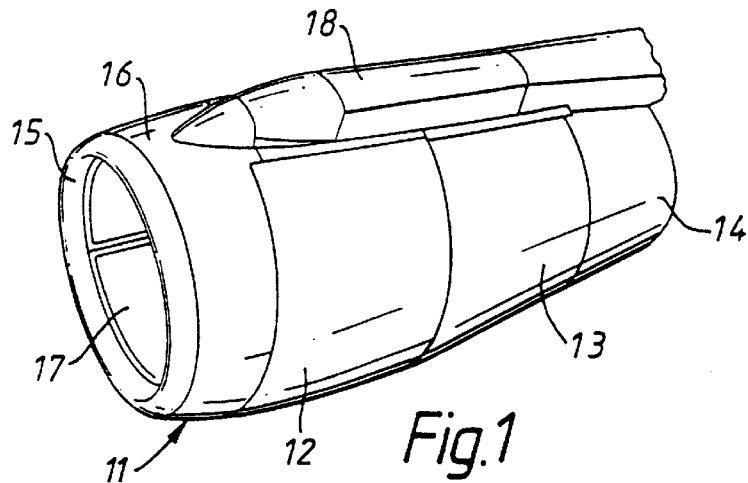

With the displaceable nacelle portions 21A and 21B in their operational positions as shown in FIG. 3 the internal and external profiles of the nacelle structure follow the profiles found in the conventional nacelle structure shown in FIG. 1. It will however be seen that the outer main skins 25 are uninterrupted throughout their rearward extent with the first break in the nacelle exterior profile occurring at the junctions between the rear ends of the outer main skins 25 and the forward end of the thrust reverser unit 131.

To gain access to the fan case 27 and equipment carried on the interior surface of the outer main skin 25 of the nacelle portion 21A or 21B and within the leading edge 22 thereof, the port and starboard nacelle portions 21A and 21B are, in accordance with the invention, pivotal outwardly with respect to the other parts of the power unit 19 including the fan case 27 and acoustic barrel 28 to displaced positions as illustrated in FIG. 2. As will be seen from FIG. 2 the interior of the outer main skin 25 and the leading edge 22 as well as the fan case are revealed giving access to them and the equipment carried by them.

By so arranging for outward displacement of the nacelle portions 21A and 21B, access can be gained to components and equipment which have hitherto required for access inspection panels and doors forming drag inducing breaks in the forward exterior profile of the nacelle structure, as well as providing access to the fan case.

Referring again to FIG. 2, the nacelle portions 21A and 21B are pivotally mounted at their upper edges to a forwardly extending support structure 182 of the pylon 181. The support structure 182 has a leading edge 183 conforming to the leading edges 22 of the nacelle portions 21A and 21B and adjoins the forward end of the intake barrel 28 to which it is secured.

It will be appreciated that the nacelle portions 21A and 21B are of double curvature and consideration needs to be given to the means by which the upper edges thereof are pivotally mounted on the support structure 182. In its simplest form, the upper edges of the nacelle portions 21A and 21B are carried by pivotal mountings extending parallel to the longitudinal axis of the nacelle structure over a predetermined length of the support structure 183 from the rearmost edge of each of the nacelle portions 21A and 21B. Other more complex pivotal mountings may however be used to provide for pivotal movement of the two nacelle portions 21A and 21B from their operational positions as shown in FIG. 3 their displaced positions as shown in FIG. 2.

It will be appreciated that it is essential to provide for proper location of the pivotal nacelle portions 21A and 21B with respect to the forward end of the acoustic barrel 28 when they are moved into their operational positions as shown in FIG. 3. For this purpose, there are provided locating means which will now be described with reference to FIGS. 4A and 4B.

As will be seen from FIG. 4A the inner lipskin edge 24 of the leading edge 22 of the nacelle portion 21B extends rearwardly over a rearwardly extending rim 261 of the arcuate bulkhead 26 and is secured thereto with the interposition of a mounting plate 29 and a locating collar element 30 which carries a slot 31 for engagement by a radially inwardly projecting rim 32 of an arcuate plate 33 secured to a flange 34 provided at the forward end of the intake barrel 28. In the position shown in FIG. 4A, the starboard nacelle portion 21B is shown displaced from its operational position. When it is pivoted to the operational position it brings the collar element 30 on the leading edge 22 over the radially inwardly extending rim 32 on the forward end of the intake barrel 28 as illustrated in FIG. 4B. Additionally, a sealing ring 35 on the flange 34 is engaged by a rearwardly extending circumferential lip 36 provided on the collar element 30. The nacelle portion 21A is provided with locating means in the same manner so that each is accurately located in its operational position by the locating means which also provides for the transmission of operational loads between the nacelle portion and the intake barrel 28.

The pivotal nacelle portions 21A and 21B will be pivotal to their displaced positions using manually operable or power assisted opening mechanisms which may be remotely operated, the mechanisms being mounted between the nacelle portions and either the pylon support structure 182 or the fan case. Door hold-open rods to retain the nacelle portions 21A and 21B in their displaced positions would also be provided between the pivotal portions 21A and 21B and either the intake barrel 28 or the fan case.

Figure 5:
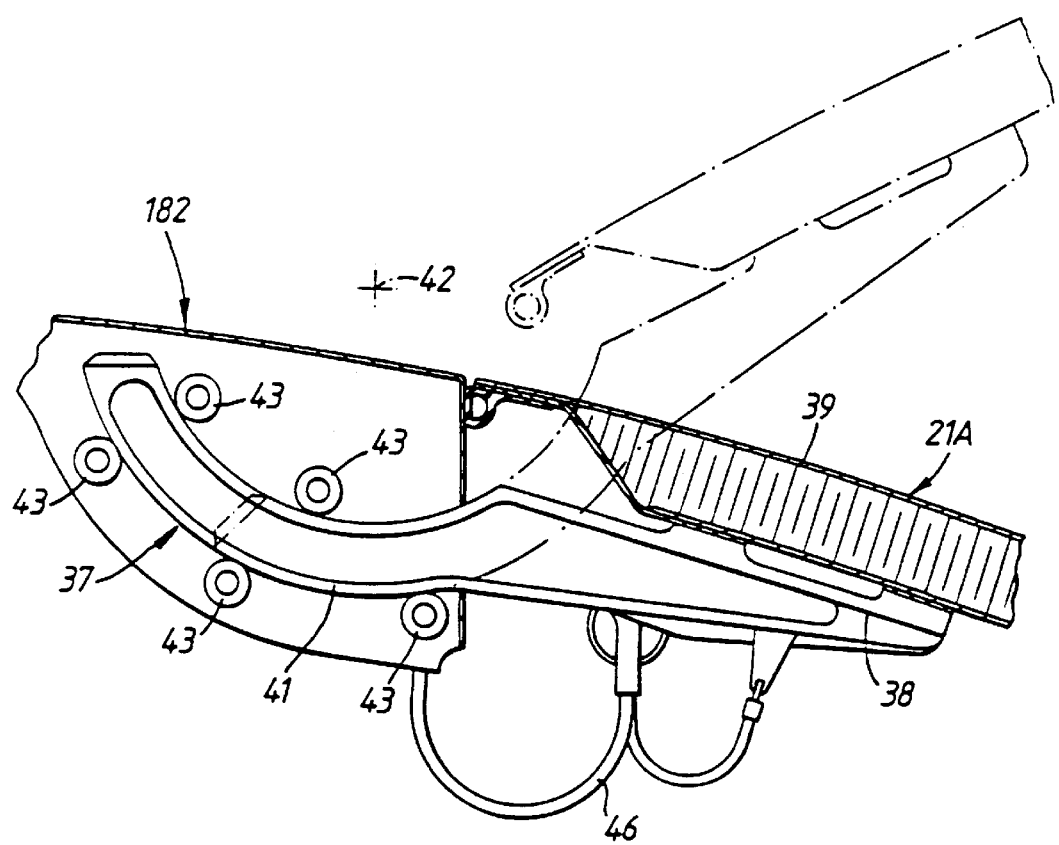
FIG. 5 is a schematic scrap view of a pivotal mounting arrangement for pivotally supporting the port and starboard displaceable nacelle portions illustrated in FIG. 2.

A pivotal mounting arrangement for pivotally supporting the nacelle portions 21A and 21B is shown in FIG. 5. The arrangement comprises a support bracket 37 which is secured at one end 38 to an uppermost edge region 39 of the port nacelle portion 21A. At its other end the bracket 37 terminates in an arcuate end support portion 41, which is guided and supported in the support structure 182 by guide rollers 43 which are rotatably mounted on the structure 182 and which guide the support portion 41 in an arcuate path about a pivot point 42.

A plurality of mounting brackets 37 are arranged in spaced relation along the upper edge of the nacelle portion 21A and engage in the same manner with the structure 182 as the bracket 37 shown in FIG. 5.

The nacelle portion 21A in FIG. 5 is shown in its closed disposition and is pivotal about the pivot point 42 outwardly with respect to the structure 182 to the position shown in broken line where it can be held in position by hold-open rods (not shown) provided between the pivotal portion 21A and either the intake barrel 28 or the fan case of the engine. A lanyard 46 is connected as shown between the upper edge of the nacelle portion 21A and the structure 182 to limit displacement of the nacelle portion 21A.

The nacelle portion 21B is pivotally supported on the other side of the structure 182 by support brackets in the same manner as the nacelle portion 21A.

The nacelle portions 21A and 21B need to be secured together in their operational positions and this may be done using any one of a variety of known latching devices for latching together the lowermost edges thereof, for example in the same manner as the latching of fan cowl doors on the conventional nacelle structure shown in FIG. 1. A series of latch mechanisms may be arranged along the bottom edges of the nacelle portions 21A and 21B which when secured would provide failsafe retention of the portions 21A and 21B in their operational positions. In addition to providing continuity and alignment between the two nacelle portions 21A and 21B the latch mechanisms would also allow for cinching of the two nacelle portions. Additional latching using conventional latching mechanisms will also be required between the upper edges of the doors and the support structure 182 in the region forward of the pivotal mountings in order to provide hoopwise continuity of the nacelle structure.

Referring now to FIGS. 6A and 6B, a suitable latch mechanism 124 is shown which includes a component part 123 which is mounted on the nacelle portion 21A at its lower edge 122 and a cooperating part 125 mounted on the nacelle portion 21B at its lower edge 126.

As best seen in FIG. 6B, the latch mechanism 124 is a toggle lever operated latch mechanism. The part 125 includes a toggle lever 127 and a toggle lever operated hook element 128 which extends from the nacelle portion 21B across the lower edge 126 and which is provided with a terminal hook 129 which engages as shown with a bar element 130 on the cooperating part 123 on the nacelle portion 21A.

In operation, the toggle lever 127 on the latch part 125 is removed from its recessed position (shown in full line) flush with the surface of the part 125 to the chain line position shown in FIG. 6B to allow the hook element 128 to engage behind the bar element 130. The toggle lever 127 is then returned to its recessed position shown in full line in FIG. 6B in which it locks the lower edges 122 and 126 of the nacelle portions 21A and 21B in their closed disposition as shown in FIGS. 6A and 6B. A release lever 132 is provided to enable the toggle lever 127 to be moved out of its recessed position when the latching parts 123 and 125 are to be disengaged and the nacelle portions 21A and 21B hinged outwardly for inspection of components on the inner surface of the outer skin 25 of nacelle portions and to give access to the fan case of the engine.

In the embodiment of the invention shown in the drawings the nacelle portions 21A and 21B extends rearwardly to the forward extent of the thrust reverser 131. Their interface with the thrust reverser 131 will be dependent upon the reverser used in the power unit 19, that is to say, translating sleeve and "C" ducts, petal doors or other types of thrust reverser.

While the present invention offers benefits to nacelle aerodynamics in general, it is anticipated that the invention will find particular application to laminar flow nacelles where the elimination of skin breaks is of fundamental importance. Such nacelles include both natural laminar flow control and hybrid laminar flow control, that is to say, a combination of a modified exterior profile and boundary layer suction.

A further benefit of the present invention is the comprehensive access which is provided by pivoting the displaceable nacelle portions 21A and 21B outwardly, thereby revealing both fan case mounted engine systems and intake mounted accessories. With a hybrid laminar flow control nacelle, the significantly improved access provided by arranging for the whole of the nacelle forebody to take the form of the pivotal displaceable nacelle portions 21A and 21B permits ready access to the flow control systems which will typically be housed below the outer skin of the nacelle structure. Such systems include the flow compartmentation, ducting, pumps and control instrumentation.

It should be noted that for the purposes of engine serviceability between flights, there may a requirement for a small number of access panels. The intention is that these intrusions are limited and that where applicable they are located as far aft as possible within the contraints of the engine design in terms of systems layout.

We claim:

1. An aircraft propulsive power unit comprising an engine, a nacelle structure which houses the engine and which includes a displaceable nacelle portion which forms a forward part of the nacelle structure and which takes up an operational position in which a forward end thereof forms part of an intake opening leading to an intake barrel located upstream of the engine for the supply of intake air to the engine, wherein the intake barrel is secured to a forward component of the engine, wherein the displaceable nacelle portion includes a leading edge profile formed by a lipskin structure at the forward end thereof which has rearwardly extending outer and inner lipskin edge portions, wherein the displaceable nacelle portion further includes an outer main skin which extends rearwardly from the outer lipskin edge portion, wherein the inner lipskin edge portion in the operational position of the displaceable nacelle portion adjoins the forward end of the intake barrel, wherein the power unit includes support means to support the displaceable portion while permitting the displaceable portion to be moved radially outwardly on the support means from its operational position to a displaced position in which the displaceable portion is supported by the support means and in which the displaceable portion is spaced radially outwardly of the intake barrel to reveal an inner surface of the rearwardly extending outer main skin and to give access to the inner surface of the outer main skin and to components mounted on the inner surface of the outer main skin, and wherein the inner lipskin edge portion of the leading edge profile of the displaceable nacelle portion in the operational position includes first engaging means for engaging with second engaging means on the forward end of the intake barrel to provide in the operational position of the displaceable nacelle portion for location of the nacelle portion with respect to the intake barrel and for transmission of operational loads between the displaceable nacelle portion and the intake barrel.

2. A unit according to claim 1, wherein the displaceable nacelle portion has an uninterrupted or a substantially uninterrupted low drag exterior surface.

3. A unit according to claim 1, wherein the support means is such as to provide for pivotal movement of the displaceable nacelle portion from its operational position to its displaced position.

4. A unit according to claim 1, wherein the engine is a turbofan engine including a ducted fan installation enclosed by a fan case and the outer main skin of the displaceable nacelle portion extends rearwardly from the outer lipskin edge portion to a position in which in the operational position of the displaceable nacelle portion the outer main skin extends over part of the fan case, which part is inaccessible with the displaceable nacelle portion in the operational position and to which part access is gained by movement of the displaceable nacelle portion to the displaced position.

5. A unit according to claim 4, wherein the rearward end of the displaceable nacelle portion terminates at a position downstream of the fan case.

6. A unit according to claim 5, wherein the nacelle structure includes a rearward nacelle portion and wherein the rearward end of the displaceable nacelle portion when the latter is moved into the operational position adjoins the forward end of the rearward nacelle portion.

7. A unit according to claim 4 wherein the engine includes a thrust reverser unit rearward of the fan installation and wherein the rearward end of the displaceable nacelle portion in the operational position terminates at the forward extent of the thrust reverser unit.

8. A unit according to claim 1 wherein the displaceable nacelle portion is a first of two displaceable nacelle portions and wherein the second of the displaceable nacelle portions is of the same form as the first displaceable nacelle portion and takes up an operational position in the structure in the same manner as the first displaceable nacelle portion and wherein support means supports the second displaceable nacelle portion in the same manner as the first displaceable nacelle portion to permit the second displaceable nacelle portion to be moved outwardly on the support means from its operational position to a displaced position in which the second displaceable nacelle portion is supported by the support means and in which the second displaceable nacelle portion is spaced outwardly of the intake barrel to reveal the inner surface of the rearwardly extending outer main skin and to give access to the inner surface of the outer main skin and to components mounted on the inner surface of the outer main skin.

9. A unit according to claim 8 wherein the support means extends along the top of the nacelle structure, wherein each of the first and second displaceable nacelle portions is supported at an uppermost edge thereof by the support means for pivotal movement with respect thereto wherein the first of the displaceable nacelle portions extends downwardly in an arcuate configuration to form a forward part of the nacelle structure on one side thereof and terminates at a lowermost edge thereof at or in the region of the base of the nacelle structure, and wherein the second of the displaceable nacelle portions extends downwardly in an arcuate configuration to form a further forward part of the nacelle strcuture on the other side thereof and terminates at a lowermost edge at or in the region of the base of the nacelle structure.

10. A unit according to claim 9 wherein the first and second displaceable nacelle portions engage each other at their lowermost edges at the base of the nacelle structure, and wherein securing means are provided to secure the lowermost edges of the two displaceable nacelle portions in engagement with each other.

11. A unit according to claim 9 wherein a forward region of the uppermost edge of each displaceable nacelle portion extends beyond the foremost point at which the edge is pivotally supported by the support means and wherein securing means are provided to secure the forward region of the uppermost edge of the displaceable nacelle portion in the operational position.

12. A unit according to claim 1 wherein the support means forms part of a supporting structure which supports the unit.

13. A unit according to claim 12 for underwing mounting on an aircraft wherein the supporting structure forms or forms part of a wing mounted pylon member for supporting the unit.

* * * * *